US006994039B1

(12) United States Patent
Beck

(10) Patent No.: US 6,994,039 B1
(45) Date of Patent: Feb. 7, 2006

(54) BULK SEED HANDLING AND DISPENSING SYSTEM

(76) Inventor: Tom J. Beck, 2433 "Y" Rd., Clarks, NE (US) 68628

(*) Notice: Subject to any disclaimer, the term of this patent is extended or adjusted under 35 U.S.C. 154(b) by 0 days.

(21) Appl. No.: 11/071,043

(22) Filed: Mar. 3, 2005

Related U.S. Application Data

(63) Continuation-in-part of application No. 10/926,179, filed on Aug. 25, 2004.

(51) Int. Cl.
*B65G 67/02* (2006.01)
*A01C 23/00* (2006.01)

(52) U.S. Cl. .......................... 111/200; 111/9; 111/925; 414/523

(58) Field of Classification Search ................ 111/200, 111/9, 925, 170, 173, 77, 8, 118–120, 56–63, 111/174; 414/523, 526; 222/105, 185, 529; 198/311, 312, 317
See application file for complete search history.

(56) References Cited

U.S. PATENT DOCUMENTS

| | | | |
|---|---|---|---|
| 4,669,945 A | 6/1987 | Pollard et al. | 414/505 |
| 4,742,938 A | 5/1988 | Niewold | 222/381 |
| 5,108,249 A | 4/1992 | Kinzenbaw et al. | 414/523 |
| 5,257,893 A | 11/1993 | Sevits | 414/523 |
| 5,718,556 A | 2/1998 | Forsyth | 414/503 |
| 5,785,481 A | 7/1998 | Ockels | 414/523 |
| 5,888,044 A | 3/1999 | Baskerville | 414/523 |
| 6,092,974 A | 7/2000 | Roth | 414/526 |
| 6,120,233 A | 9/2000 | Adam | 414/502 |
| 6,396,003 B1 | 5/2002 | Friesen | 177/136 |
| 6,772,702 B2 | 8/2004 | Lee et al. | 111/174 |

*Primary Examiner*—Christopher J. Novosad
(74) *Attorney, Agent, or Firm*—Thomte, Mazour & Niebergall; Dennis L. Thomte

(57) ABSTRACT

A bulk seed handler and dispenser is provided for transporting bulk seed containers and for dispensing the seed within the containers into planting equipment. The bulk seed handler and dispenser is comprised of a trailer having a plurality of bulk seed containers mounted thereon, each of which is in communication with individual hoppers located therebelow. A horizontally disposed conveyor auger is in communication with each of the hoppers and is adapted to convey the seed from the hoppers to a transition box located at the forward end of the conveyor auger. A seed discharge auger has its lower end in communication with the transition box and extends upwardly and laterally therefrom. A discharge tube is connected to the upper end of the seed discharge auger which is maneuvered for placement adjacent planter unit hoppers.

5 Claims, 5 Drawing Sheets

BULK SEED HANDLING AND DISPENSING SYSTEM

CROSS-REFERENCE TO RELATED APPLICATION

This is a continuation-in-part application of Petitioner's earlier application Ser. No. 10/926,179 filed Aug. 25, 2004, entitled "BULK SEED HANDLING AND DISPENSING SYSTEM".

BACKGROUND OF THE INVENTION

1. Field of the Invention

This invention relates to a bulk seed handling and dispensing system and more particularly to a system wherein a plurality of bulk seed containers are selectively removably positioned on a trailer and means for dispensing the seed therefrom into planting units is provided thereon.

2. Description of the Related Art

Agricultural seeding machines such as a row crop planter or grain drill are used to place seeds at a desired depth within a plurality of parallel seed trenches. Historically, row crops such as corn are planted with row planters which normally consist of a plurality of spaced-apart planter units mounted on a supporting frame such as a tool bar or the like. Usually, each of the planter units includes a seed box or hopper thereon which must be filled with seed. Non-row crops such as wheat, soybeans, oats, barley, etc., are planted by means of grain drills. The grain drills include a seed hopper positioned thereon. In both types of planting, the seed boxes or hoppers thereof must be filled with seed. In many cases, individual bags of seed are hand-carried to the planters with the seed being poured therefrom into the planter boxes or hoppers. In recent years, seed has been supplied to the farmers in bulk form, that is, the seed is contained in large seed containers, sometimes called "totes," carried on a trailer or the like and is dispensed therefrom to the planter boxes or hoppers by an auger conveyor.

It is believed that the prior art bulk seed handling or dispensing systems suffer from one or more drawbacks or disadvantages. First, in certain systems where two or more seed containers or totes are positioned on a trailer, the seed from the two or more seed containers flow into a common hopper from which the seed is dispensed which makes it impossible to have different seed hybrids or varieties in different containers on the trailer. Second, the prior art bulk seed handling systems are not believed to have a convenient means for cleaning out the seed hopper beneath the seed container thereby possibly resulting in contamination of one seed hybrid or variety with another seed hybrid or variety if the system first dispenses one seed hybrid or variety and is then used to dispense another seed hybrid or variety. Third, the prior art bulk seed handling systems are believed to have a high center of gravity due to the fact that the seed containers are positioned substantially above the ground or road surface. Such a high center of gravity may result in the system overturning when traveling around a curve or corner or over rough terrain. Fourth, the prior art bulk seed handling systems are not believed to be convenient to use.

Applicant's invention described in the co-pending application truly represents an advance in the bulk seed handling and dispensing system art. The instant invention is believed to represent a further advance in the art in that, among other things, the system has an even lower center of gravity than that described and shown in the co-pending application. Additionally, the instant invention can accommodate an additional tote.

SUMMARY OF THE INVENTION

A bulk seed handling and dispensing cart, caddy, trailer, apparatus, etc., is described for transporting bulk seed containers and for dispensing the seed from the containers into the seed hoppers or boxes on planting equipment. The apparatus includes a wheeled frame such as a trailer having a forward end, a rearward end, and first and second sides. The wheeled frame has a forwardly extending hitch tongue or the like for connection to a prime mover such as a truck or tractor. A generally horizontally disposed deck is positioned on the wheeled frame which defines a front deck portion, a middle deck portion and a rear deck portion. The front, middle and rear deck portions are adapted to have front, middle and back bulk seed containers positioned thereon, respectively. The front, middle and rear deck portions each have a seed inlet opening formed therein which is in communication with the selectively closable discharge opening in the seed tote positioned upon the respective deck portion. A front seed hopper is positioned beneath the front seed inlet opening and has an open upper end in communication therewith. A middle seed hopper is positioned beneath the middle seed inlet opening and has an open upper end in communication therewith. A rear seed hopper is positioned beneath the rear seed inlet opening and has an open upper end in communication therewith. An elongated, horizontally disposed auger conveyor housing, having rearward and forward ends, is positioned beneath the hoppers and extends from the rear hopper to the front of the wheeled frame. The auger conveyor housing has horizontally spaced-apart openings formed therein which communicate with the lower ends of the hoppers. An auger conveyor is rotatably mounted within the auger housing and is adapted to convey the seed from the hoppers forwardly to a transition box which is at the forward end of the auger conveyor housing. A seed discharge auger conveyor is provided on the wheeled frame and has upper and lower ends. An internal combustion engine is provided on the wheeled frame and is adapted to operate the discharge auger conveyor. The lower end of the discharge auger conveyor is in communication with the transition box with the discharge auger conveyor extending upwardly and generally laterally from the wheeled frame. A telescopic seed discharge tube has its upper end connected to the upper end of the discharge auger conveyor. The lower end of the seed discharge tube may be maneuvered to each of the seed boxes or hoppers on the planters to fill the same. A remote control is provided at the lower end of the discharge tube to control the operation of the seed discharge auger conveyor by varying the speed of the engine.

It is therefore a principal object of the invention to provide an improved bulk seed handling and dispensing system.

A further object of the invention is to provide a bulk seed handling and dispensing system wherein at least three bulk seed containers are positioned on a wheeled frame such as a trailer.

Yet another object of the invention is to provide a system of the type described wherein seed in each of the seed containers is fed into an individual hopper which is in selective communication with a discharge auger conveyor.

Still another object of the invention is to provide a system of the type described which has a low center of gravity.

Still another object of the invention is to provide a system of the type described which has a clean out mechanism associated with the transition box.

Yet another object of the invention is to provide a system of the type described which is convenient to use.

These and other objects will be apparent to those skilled in the art.

DETAILED DESCRIPTION OF THE INVENTION

Figure 1:
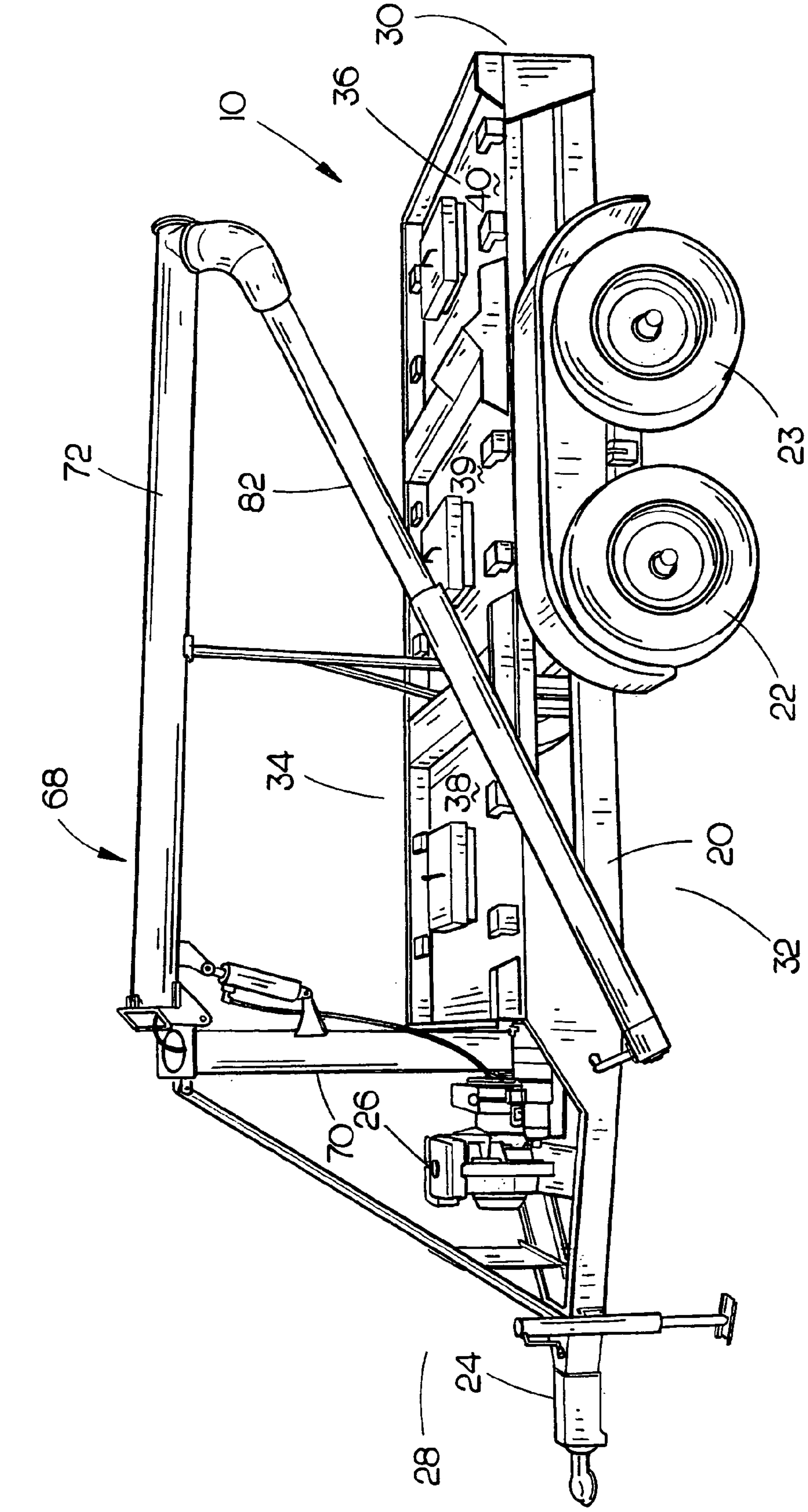
FIG. 1 is a perspective view of the system of this invention.
Figure 2:
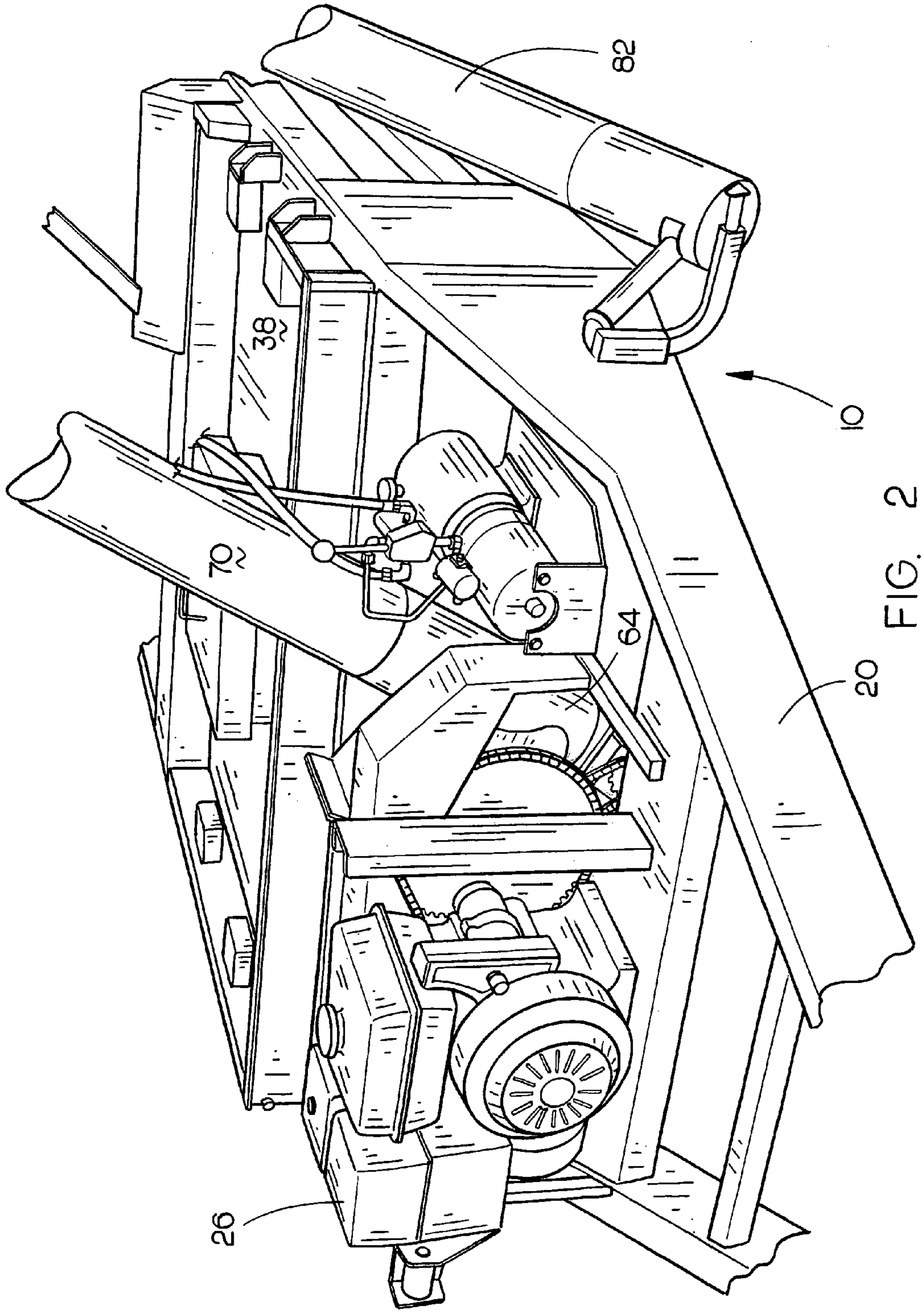
FIG. 2 is a partial front perspective view of the system of this invention.
Figure 3:
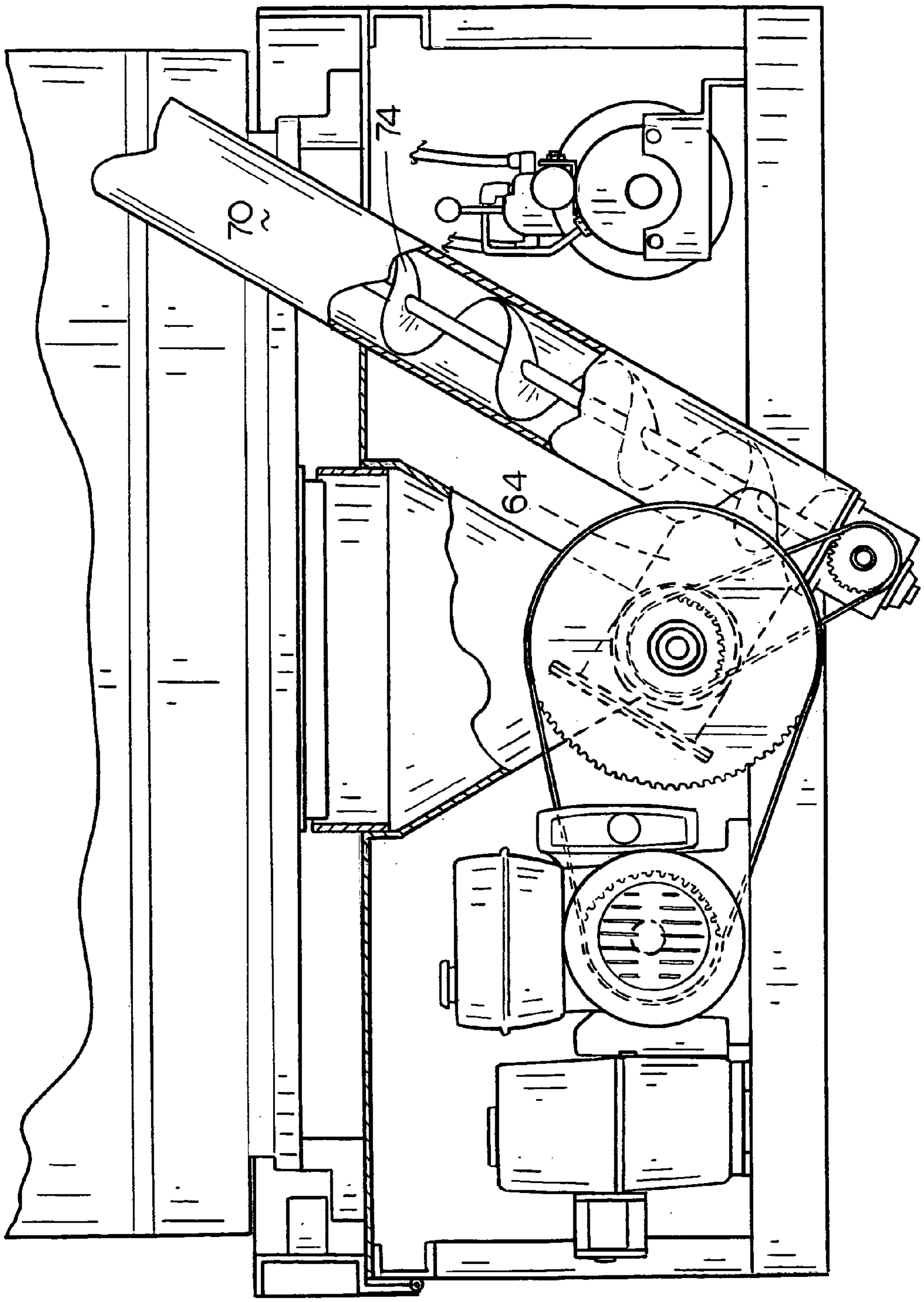
FIG. 3 is a partial front view of the system with portions thereof cut away to more fully illustrate the invention.

The seed dispensing cart, caddy, trailer, system or apparatus of this invention is generally designated by the reference numeral 10 which is designed for transporting bulk seed containers 12, 13 and 14, which are identical to each other, and for dispensing the seed within the containers into seed boxes or hoppers of planting equipment such as row crop planters or grain drills. The containers 12, 13 and 14 are sometimes referred to as totes and are readily available from one or more manufacturers. The containers are usually constructed of plastic. Each of the containers or totes 12, 13 and 14 include a sloped floor 15 so that the seed therein will gravity flow to the discharge opening 16 therein which is selectively closed by a manually operated slide gate 18.

The seed cart, caddy, apparatus, system or trailer will be referred to herein, for purposes of description, as a "trailer." Trailer 10 includes a wheeled frame 20 supported by wheels 22 and 23 at each side thereof. Preferably, the front wheels 22 include brakes. A forwardly extending tongue or hitch 24 is provided on the wheeled frame 20 so that the trailer may be towed by a prime mover such as a truck, pickup, tractor, etc. An internal combustion engine 26 is mounted on the frame 20 for powering the conveyor augers as will be described in more detail hereinafter. It is preferred that an internal combustion engine 26 be utilized but the power source for the conveyor auger could be electrically driven, hydraulically driven or combinations thereof. Further, if the trailer 10 is being pulled by a tractor or the like, the source of power for the conveyor augers could be the tractor power take-off (PTO).

For purposes of description, the trailer 10 will be described as having a forward end 28, rearward end 30, a left side 32 and a right side 34. Trailer 10 is provided with a generally horizontally disposed deck 36 which defines a front deck portion 38, a middle deck portion 39 and a rear deck portion 40. The deck portions 38, 39 and 40 are provided with conventional attachment means for securing the containers or totes 12, 13 and 14 thereon. Front deck portion 38 is provided with a seed inlet opening 42 which is in communication with the discharge opening 16 of the container 12 which is positioned on front deck portion 38. Middle deck portion 39 is provided with a seed inlet opening 43 which is in communication with a discharge opening 45 of the container 13 which is positioned on the middle deck portion 39. Seed inlet opening 44 is provided in rear deck portion 40 and is in communication with the discharge opening 16 in the container 14 positioned on rear deck portion 40. Hoppers, chutes or guides 46, 48 and 50 are positioned beneath inlet openings 42, 43 and 44, respectively.

Figure 4:
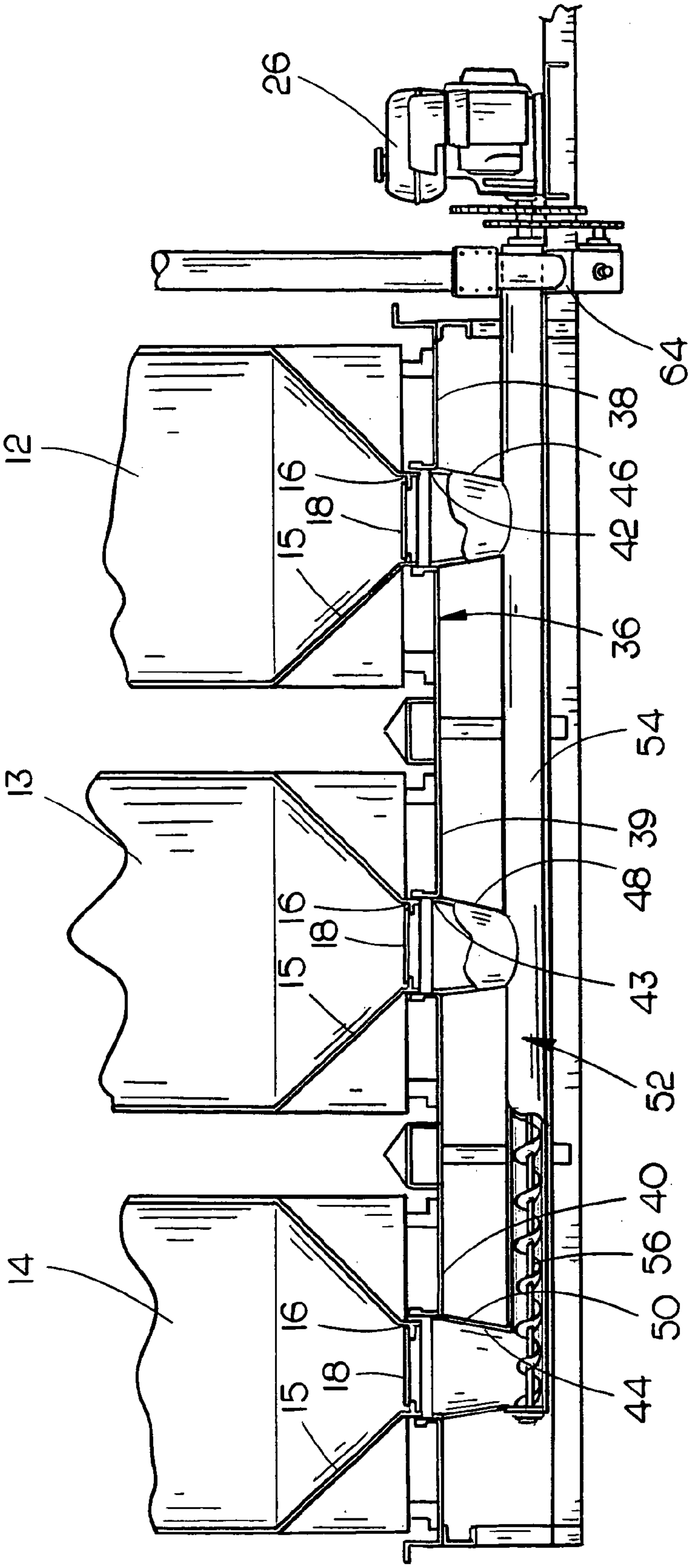
FIG. 4 is a partial side view of the system with portions thereof cut away to more fully illustrate the invention.
Figure 5:
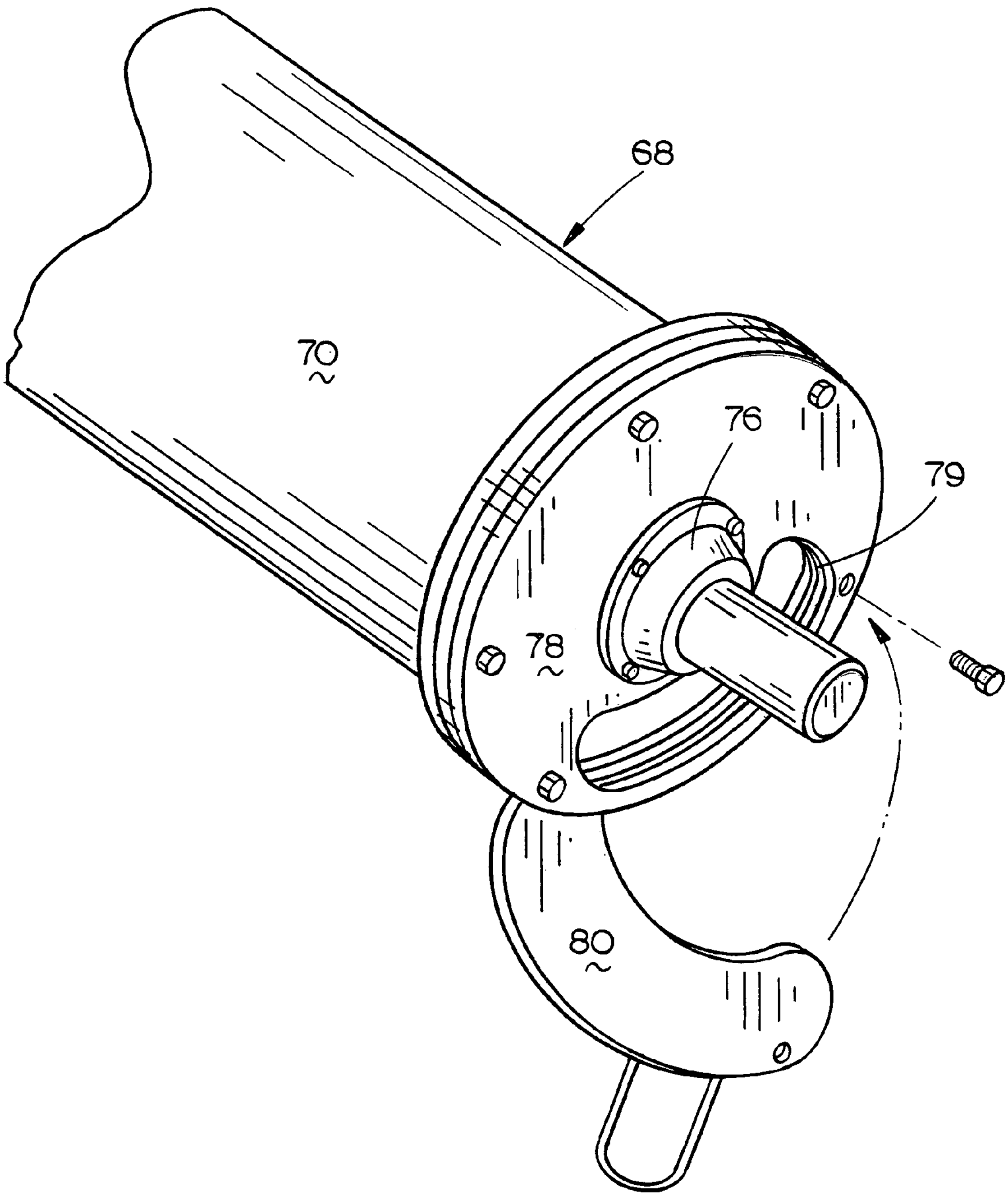
FIG. 5 is a partial perspective view of the clean-out mechanism at the lower end of the discharge auger conveyor.

An elongated, horizontally disposed auger conveyor 52 is positioned below hoppers 46, 48 and 50 and includes a housing 54 having an auger 56 rotatably mounted therein. The housing 54 has openings 58, 60 and 62 formed therein which communicate with the lower ends of the hoppers 46, 48 and 50, respectively. Preferably, the auger 56 is of the plastic "cup" design such as manufactured by Lundell Manufacturing of Odebolt, Iowa. The forward end of auger conveyor 52 extends forwardly of hopper 46, as seen in FIG. 4. A transition box or hopper 64 is in communication with the discharge end of the conveyor 52.

The numeral 68 refers to a conveyor screw auger including a lower auger section 70 and an upper auger section 72 which is selectively pivotally secured to the upper end of auger section 70. Conveyor auger 68 includes a rotatable auger 74, the lower end of which is positioned within the interior of box 64 at one side thereof. As stated earlier, the conveyor auger is selectively rotatable by the engine 26. The lower end of auger portion 74 extends below the lower end of the transition box 64 and has a bearing 76 provided therein which rotatably supports the lower end of the auger shaft. The lower end of the lower section 70 is closed by a plate 78 having a semi-circular opening 79 formed therein which is selectively closed by a pivotal gate 80. When the gate 80 is in its closed position, the seed in the auger housing cannot flow downwardly from the box 64 or conveyor 52. When the gate 80 is in its open position, the box 64 and augers may be "cleaned out." Thus, the gate 80, in cooperation with the opening 79, acts as a clean out mechanism.

A telescopic flexible tube 82 extends from the upper end of the conveyor auger 68 so that the operator may position the discharge end of the tube 82 over the planter seed boxes or hoppers to fill the same. A remote control is provided at the discharge end of the tube 82 for controlling the speed of the engine 26. When the box 64 is full of seed, the idling engine was not cause the rotation of the auger 68 due to the resistance of the seed on the auger. When the remote control is energized, the engine speed will be increased which will cause the conveyor to overcome the resistance of the grain in the box 64 so that the seed will be conveyed upwardly through the conveyor 68 and downwardly through the tube 82. When the planter box or hopper is full, the operator releases the remote control which causes the engine to again idle which in turn causes the conveyor to discontinue its rotation.

The apparatus of this invention is a low profile apparatus which makes it very easy to transport the same over highways without fear that the apparatus will tip over as it is being negotiated through a curve or over irregular ground.

Thus it can be seen that the invention accomplishes at least all of its stated objectives.

What is claimed is:

1. A seed handling and dispensing apparatus for transporting bulk seed containers and for dispensing the seed within said containers into planting equipment, comprising:

a wheeled frame having a forward end, a rearward end, and first and second sides;

said wheeled frame having a hitch at the forward end thereof for connection to a prime mover;

a generally horizontally disposed deck provided on said wheeled frame defining at least a front deck portion, a middle deck portion and a rear deck portion;

said front, middle and rear deck portions adapted to have front, middle and back bulk seed containers positioned thereon, respectively;

said front deck portion having a front seed inlet opening formed thereon;

said middle deck portion having a middle seed inlet opening formed therein;

said rear deck portion having a rear seed inlet opening formed therein;

a front seed hopper positioned beneath said front seed inlet opening and having an open upper end in communication therewith;

a middle seed hopper positioned beneath said middle seed inlet opening and having an open upper end in communication therewith;

a rear seed hopper positioned beneath said rear seed inlet opening and having an open upper end in communication therewith;

a conveyor auger housing positioned at the lower ends of said front, middle and rear seed hoppers which is in communication with said front, middle and rear seed hoppers;

said conveyor auger housing having rearward and forward ends;

an auger conveyor positioned within said conveyor auger housing;

a transition box, having upper and lower ends, at the forward end of said conveyor auger housing and being in communication therewith;

a seed discharge auger conveyor on said wheeled frame and having upper and lower ends;

said discharge auger conveyor being in communication with said transition box above said lower end of said discharge auger conveyor;

said lower end of said discharge auger conveyor being disposed below said lower end of said transition box;

said discharge auger conveyor extending upwardly and generally laterally from said wheeled frame;

a seed discharge tube having upper and lower ends;

said upper end of said tube being connected to and being in communication with said upper end of said seed discharge auger conveyor;

a power means adapted to operate said conveyors;

and a seed clean out mechanism at said lower end of said seed discharge auger conveyor.

2. The apparatus of claim 1 wherein said seed clean out mechanism comprises a disc-shaped plate having a discharge opening formed therein which is selectively closeable by a pivotal plate selectively movable between open and closed positions.

3. A seed handling and dispensing apparatus for transporting bulk seed containers and for dispensing the seed within said containers into planting equipment, comprising:

a wheeled frame having a forward end, a rearward end, and first and second sides;

said wheeled frame having a hitch at the forward end thereof for connection to a prime mover;

a generally horizontally disposed deck provided on said wheeled frame defining a plurality of deck portions;

said deck portions adapted to have bulk seed containers positioned thereon, respectively;

each of said deck portions having a seed inlet opening formed thereon;

a seed hopper positioned beneath each of said seed inlet openings and having an open upper end in communication therewith;

a conveyor auger housing positioned at the lower ends of said seed hoppers which is in communication therewith;

said conveyor auger housing having rearward and forward ends;

a transition box, having upper and lower ends, at the forward end of said conveyor auger housing and being in communication therewith;

an auger conveyor positioned within said conveyor auger housing;

a seed discharge auger conveyor on said wheeled frame and having upper and lower ends;

said discharge auger conveyor being in communication with said transition box above said lower end of said discharge auger conveyor;

said lower end of said discharge auger conveyor being disposed below said lower end of said transition box;

said seed discharge auger conveyor extending upwardly and generally laterally from said wheeled frame;

a seed discharge tube having upper and lower ends;

said upper end of said tube being connected to and being in communication with said upper end of said discharge auger conveyor;

a power means adapted to operate said discharge auger conveyor;

and a seed clean out mechanism at said lower end of said discharge auger conveyor.

4. The apparatus of claim 3 wherein said seed clean out mechanism comprises a disc-shaped plate having a discharge opening formed therein which is selectively closeable by a pivotal plate selectively movable between open and closed positions.

5. The apparatus of claim 3 wherein at least three deck portions are provided on said deck.

* * * * *